RECORD HOLDER

Filed July 7, 1958

INVENTORS.
DAVE USHER
RAYMOND H. GLASSMAN
WILLIAM P. HOPKINS
BY Robert A. Sloman
ATTORNEY.

3,004,659
RECORD HOLDER

Dave Usher, 22155 Hessel, Detroit 19, Mich.; Raymond H. Glassman, 21900 Kipling, Oak Park, Mich.; and William P. Hopkins, 227 Merrill, Birmingham, Mich.

Filed July 7, 1958, Ser. No. 746,786
10 Claims. (Cl. 206—62)

This invention relates to phonograph record holders and more particularly to a novel multiple record package.

It is the object of the present invention to provide a novel record package or envelope construction which conveniently encloses a pair of records in spaced apart relation which may be the same or different sizes.

It is another object to provide a novel record package which includes a partition and upon opposite sides a pair of cardboard covers juxtaposed and extending over approximately ½ of the opposite surfaces, and secured thereto at the adjacent margins to define with said partition on its opposite sides a pair of outwardly opening record receiving envelopes.

It is another object to provide the envelopes on opposite sides of the partition of different sizes to thus provide for the carrying of a relatively large record and a relatively small record. This may be used as a kangaroo package for conveniently merchandising the two records in a single package, as an added value or as a bonus or other inducement.

It is a further object of the present invention to provide a hollow rectangular cover for the portion of the package partition which has been left exposed by the first mentioned envelope defining covers.

It is a further object to provide a novel record package wherein a substantial portion of a large record will project from one envelope, and a small portion of a small record will project from the other envelope, and wherein a removable cover normally overlies and protectively encloses the exposed portions of said records, and with the inner margins of said cover in cooperative registry with the corresponding margins of the envelope defining covers to provide on assembly a conventionally shaped record package.

It is a further object to employ in conjunction with the stationary and removable covers more than one partition to provide for an increased number of storage envelopes.

These and other objects will be seen from the following specification and claims in conjunction with the appended drawing in which:

It will be understood that the above drawing illustrates merely preferred embodiments of the invention and that other embodiments are contemplated within the scope of the claims hereafter set forth.

Figures 1, 2, 3:
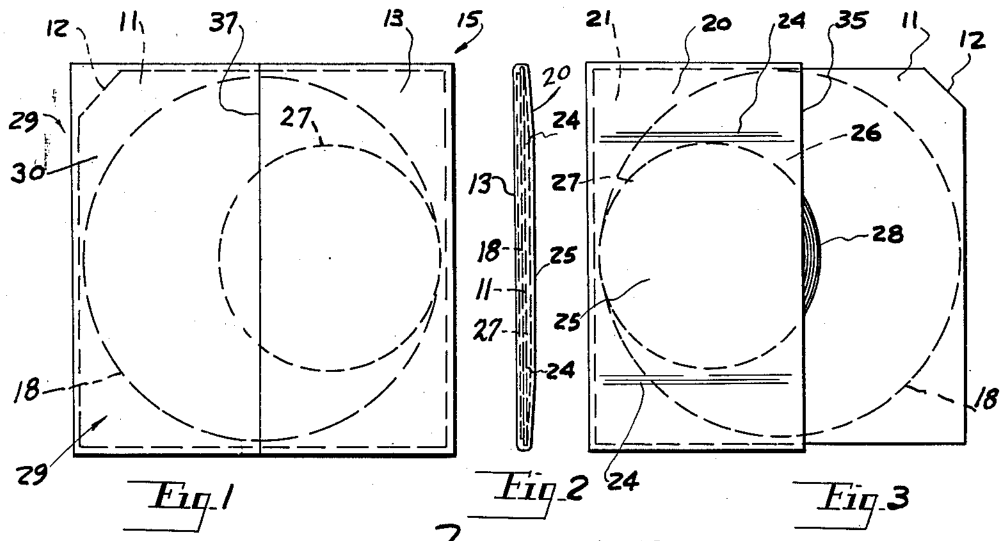
FIG. 1 is a side elevational view of the record package with the records therein shown in phantom.
FIG. 2 is an end elevational view thereof.
FIG. 3 is a rear elevational view of the package shown in FIG. 1 with the cover removed.

Referring to the drawing, the present record package includes a rectangular partition 11, preferably square as shown, one corner of which is cut away at 12 to facilitate positioning of removable cover 29 for assembly to the position shown in FIG. 1.

Figures 4, 5, 6, 7, 8, 9, 10, 11, 12:
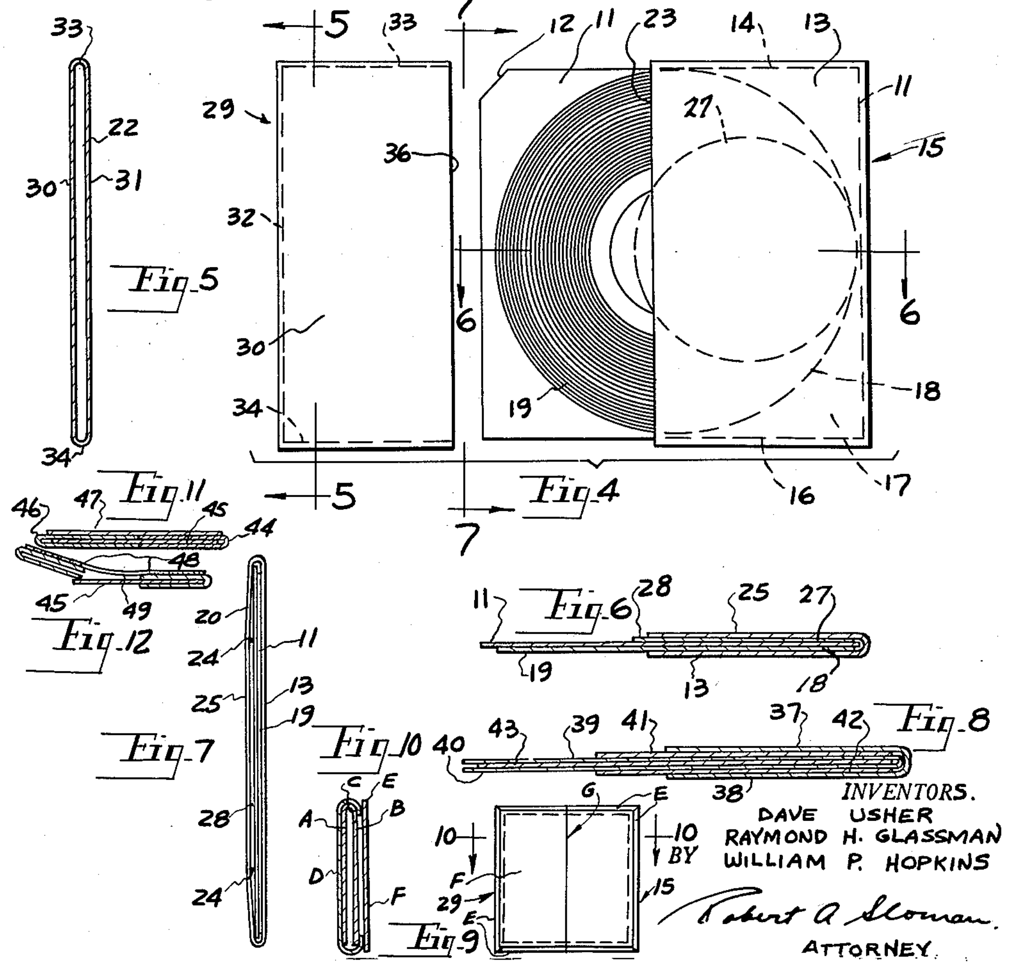
FIG. 4 is a side elevational view similar to FIG. 1 with the cover removed and separately shown in position for assembly.
FIG. 5 is a section taken on line 5–5 of FIG. 4.
FIG. 6 is a section taken on line 6–6 of FIG. 4.
FIG. 7 is a section taken on line 7–7 of FIG. 4.
FIG. 8 is a view similar to FIG. 6 showing multiple partitions.
FIG. 9 is a rear elevational view of the record holder illustrating the binding thereof.
FIG. 10 is a section taken on line 10–10 of FIG. 9.
FIG. 11 is a plan view of a slight variation of record holder construction.
FIG. 12 is a similar view thereof with the cover removed.

FIGS. 9–10 illustrate the steps of forming the stationary and removable covers for partition 11. Initially an elongated strip of cardboard or other composition of rectangular shape is folded over on itself defining elements A and B with backbone C.

As a second step, a printed cover sheet D, oversized with respect to cover element A is mounted thereover so that the four side edges thereof may be folded over and adhesively secured at E to the outer surface of element B.

The binding is finished off by adhesively mounting liner sheet F over cover element B overlapping flaps E. As a final step the assembly is vertically severed along the line G thereby defining a pair of hollow cover elements 15 and 29. Each of the respective cover elements is closed on 3-sides with the fourth side open as at 23 and 36 respectively, FIG. 4.

Referring to FIGS. 1 through 7 the hollow stationary cover 15 is snugly projected over substantially half the surface of partition 11 and secured thereto. This may be accomplished in several ways.

In the preferred embodiment of the invention top and bottom edge portions 14—16 of partition 11 corresponding to the right half thereof, FIG. 4, are formed with a slight taper which extends outwardly, starting from a central portion thereof. Portions 14 and 16 then are snugly and frictionally projected within cover 15 so that in effect said cover at its edges is substantially secured upon the partition. Other means may be employed for securing marginal portions of said partition within cover 15, such as by gluing, or other adhesive.

Cover 15 includes cardboard elements 13 and 20 joined together along three of their edges, which define with partition 11 a pair of storage envelopes 17 and 21 on its opposite sides adapted to receive a pair of records. These records may be either large or small and may be of the same or different sizes.

To provide a storage compartment adapted to receive a small record such as a 7-inch record, for illustration, parallel spaced interior surface portions 24 of cover element 20 are adhesively or otherwise secured to surface portions of partition 11 defining with said partition and the intermediate cover element 25, the storage chamber 26 for record 27, a small portion of which is exposed as at 28, for easy access. Free edges 23, 35 of cover 15 are spaced slightly outward of partition 11 providing openings to envelopes 17, 26.

As shown in FIG. 4, envelope 17 is adapted to receive, if desired, large size record 18, such as a 10 or 12 inch record, for illustration. Cover 15 is of such width that a material portion 19 of record 18 is exposed, said record overlying the surface of partition 11.

By the construction shown in FIGS. 3 and 4 there is provided upon opposite sides of partition 11, a pair of storage envelopes 17—26 adapted to receive records of different sizes, or with the omission of elements 24 and their securing, a pair of records of the same or different sizes.

The above described second cover 29 is then loosely and removably mounted over the uncovered portion of partition 11, extending to the free edge 23 of cover 15.

Cover 29 as shown in FIG. 4 includes the pair of ocver elements 30—31 which are joined together along 3 of its sides as at 32—33 and 34, defining internal chamber 22 adapted to cooperatively receive a portion of partition 11 and the projecting portions 19 and 28 of the two records.

Cover 29 is assembled as above described in connection with FIGS. 9 and 10.

Partition 11, as shown in FIG. 4, is of such height as to be slidably received within removable cover 29.

The covers 15 and 29 are of the same height and their respective cover elements 13, 20 and 30, 31 are coplanar so that when removable cover 29 has been mounted over partition 11, the outer edges 23—35 of stationary cover 15 are in registry with the corresponding outer edges 36 of cover 29 along the parting line 37, FIG. 1.

Accordingly upon assembly the present record holder has substantially the same outside appearance as the conventional record holder but for parting line 37 which extends completely around the package.

It is contemplated as a part of the present invention that the overall record package have a suitable covering D in FIG. 10, in color and with illustrations in a conventional manner. The only interruption in the illustrations is parting line 37 which does not materially detract from the overall appearance.

The main difference in the present record package is that instead of the record opening at the side of a regular record package, there is provided a removable protective cover and wherein upon removal of this cover a pair of records of different sizes are nevertheless still positioned within the envelopes upon opposite sides of the partition. At the same time, a sufficient portion of each record is exposed as to facilitate easy removal. It is contemplated that the envelopes may be of the same size.

In use, if the record package is stored in a vertical position, it would be preferable to rotate the package in FIG. 1 ninety degrees. This would prevent accidental separation of the removable cover and partition.

FIG. 8 illustrates a slight variation of record holder construction wherein two partitions are employed for increasing the number of storage envelopes. The present invention may be employed using an increased number of partitions, if desired, i.e., two or more.

In FIG. 8, the stationary cover, similar to cover 15, consists of cover elements 37—38 and fixedly projected thereinto a pair of slightly spaced partitions 39—40. Edge portions of these are slightly tapered outwardly the same as at 14—16 in FIG. 4 providing a means of fixedly securing the partitions tightly within said cover.

Said cover is furthermore closed on its 3-sides so that outwardly opening envelopes are provided between the respective cover elements 37—38 and adjacent partitions 39—40 adapted to receive records 41—42. Partitions 39—40 define therebetween an additional outwardly opening envelope adapted to receive and store record 43. More than two partitions may be employed.

A protective cover for this assembly is also provided of the same construction as cover 29, FIGS. 4 and 5, and which is adapted to be removably positioned over partitions 39—40 and exposed portions of records 41—42 in the same manner as cover 29 in FIG. 1.

A slight variation of the present invention is shown in FIGS. 11 and 12 wherein means are provided for yieldingly connecting the removable cover with the stationary cover so as to prevent accidental misplacement or displacement and to facilitate re-assembly and securing of the removable cover in position.

In FIGS. 11 and 12 there is generally shown stationary cover 44 from which outwardly projects partition 45 providing with the respective cover elements a pair of storage envelopes the same as cover 15 as above described in connection with FIG. 4.

Removable cover 46 is employed similar to cover 29 and functioning in the same manner adapted to enclose the exposed portion of partition 45 which projects from cover 44 and to also cover the exposed portions of any records within the envelopes formed in cover 44.

Juxtaposed over the rear surfaces of covers 44—46 is a rectangular and flexible sheet of material 47 which may be of rubber, plastic, or other elastic material and which is adhesively secured to the two covers up to points spaced outwardly of the parting line as at 48, FIG. 12.

To remove cover 46, the said backing 47 is partly stretched as indicated at 49, FIG. 12, until the projecting partition 45 is exposed.

The stretched central portion 49 of backing 47 functions similarly to a hinge, yet provides a fixed but yielding relationship between the two covers. Upon re-assembly backing 47 is stretched to permit insertion of partition 45 into cover 46 to the extent necessary. Said flexible backing performs the further function of securing the removable cover 47 with respect to fixed cover 44.

Having described our invention, reference should now be had to the following claims.

We claim:

1. A phonograph record package comprising a partition, a hollow cover first open at one end projected over substantially one-half of said partition and peripherally secured to peripheral portions thereof, defining with said partition on its opposite sides a pair of storage envelopes opening laterally at substantially the center of said partition, a record bearing on each side of said partition and partly projected into an envelope, and a hollow removable cover open at one end removably positioned over the uncovered portion of said partition, and over projecting portions of said records, said covers being of the same height and their outer surfaces substantially coplanar.

2. The record package of claim 1, portions of said partition outwardly of said first cover being of slightly reduced height to cooperatively receive said removable cover.

3. The record package of claim 1, parallel spaced intermediate portions on one side of said first cover being joined to said partition in lines at right angles to the open edge of one envelope defining therewith a reduced height for one of said envelopes compared with the other envelope, one of said records being of reduced diameter to snugly fit into the smaller envelope.

4. The phonograph record package of claim 1, and an elastic strip extending substantially over one outer side surface of both covers and secured thereto, said removable cover being disengaged from said partition on outward stretching of said strip relative to said stationary cover, said strip providing a flexible yielding connection between said covers and adapted to maintain said covers together in record enclosing position.

5. The record package of claim 1, parallel spaced intermediate portions on one side of said first cover being joined to said partition defining therewith a reduced height for one of said envelopes compared with the other envelope, and an elastic strip extending substantially over one outer side surface of both covers and secured thereto, said removable cover being disengaged from said partition on outward stretching of said strip relative to said stationary cover, said strip providing a flexible yielding connection between said covers and adapted to maintain said covers together in record enclosing position.

6. A phonograph record package comprising a rectangular partition, a first cover juxtaposed and extending over approximately ½ the partition surface on one side thereof and secured thereto adjacent its edges defining an envelope opening laterally adjacent the center of said partition, a record projected into said envelope, a second cover of the same size as said first cover juxtaposed and extending over a similar surface portion on the opposite side of said partition and secured thereto adjacent its edge, defining a second envelope on the other side of said partition, a second record projected into the second envelope and a hollow removable cover open at one end positioned over said partition with its outer edges in engaging relation with the corresponding inner edges of said first and second envelope defining covers.

7. A phonograph record package comprising a partition, a first cover juxtaposed and extending over approximately ½ the partition surface on one side thereof and secured thereto adjacent its edges, defining an envelope opening laterally adjacent the center of said partition a conventional large size record supportedly projected into said envelope, a second cover of the same size as said first cover juxtaposed and extending over a similar surface portion on the opposite side of said partition and secured thereto adjacent its edges, parallel spaced intermediate portions of said second cover being joined to said partition in lines at right angles to the open edge of said envelope defining therewith a second envelope on the other side of said partition opening laterally adjacent the center of said partition a relatively small size record supportedly projected into said second envelope, and a hollow removable cover open at one end positioned over said partition with its outer edges in engaging relation with the corresponding inner edges of said first and second envelope defining covers.

8. The record package of claim 7, said partition being of such size that the large size record is substantially coextensive therewith, said first cover being of such size that an appreciable portion of said record extends from one envelope, said second envelope defining cover being of such size that the larger portion of said smaller record is enclosed within the envelope defined thereby.

9. A phonograph record package comprising a pair of parallel loosely engaging partitions, a hollow cover open at one end projected substantially over and receiving one-half of each of said partitions and peripherally secured to corresponding edge portions thereof, said cover defining with the outer surfaces of said partitions a pair of envelopes opening laterally at substantially the center of said partitions a pair of records supportedly projected into said envelopes respectively, said partitions and edge portions of said cover defining therebetween third record storage envelope opening laterally, a record within said third envelope, and a hollow removable cover open at one end removably positioned over the uncovered portions of said partitions and over projecting portions of said pair of records, said covers being of the same height with their outer surfaces substantially coplanar, and engaging each other at their open ends in edge to edge relation.

10. A phonograph record package comprising a plurality of loosely engaging parallel partitions, a hollow cover open at one end projected over substantially one-half of and receiving said partitions and peripherally secured to edge corresponding portions thereof, defining with the outer surfaces of the outer partitions a pair of storage envelopes opening laterally at substantially the center of said partitions, a pair of records respectively projected into said envelopes, adjacent pairs of partitions with edge portions of said cover defining therebetween additional record storage envelopes opening laterally, a record projected into each of said additional envelopes, and a hollow removable cover open at one end removably positioned over the uncovered portions of said partitions and over projecting portions of said records, said covers being of the same height with their outer surfaces substantially coplanar, and engaging each other at their open ends in edge to edge relation.

References Cited in the file of this patent

UNITED STATES PATENTS

| | | |
|---|---|---|
| 1,339,194 | Grammich | May 4, 1920 |
| 1,876,181 | Tussing | Sept. 6, 1932 |
| 2,274,278 | Sanders | Feb. 24, 1942 |
| 2,327,713 | Hunter | Aug. 24, 1943 |
| 2,580,141 | Vidal | Dec. 25, 1951 |
| 2,777,574 | Brody | Jan. 15, 1957 |

FOREIGN PATENTS

| | | |
|---|---|---|
| 876,403 | France | Aug. 3, 1942 |